United States Patent
Lee et al.

(10) Patent No.: US 7,478,172 B1
(45) Date of Patent: Jan. 13, 2009

(54) SUPPORTING COMMUNICATION APPLICATIONS BETWEEN ENTERPRISES IN A SECURE MANNER

(75) Inventors: Jaushin Lee, Saratoga, CA (US); Budi Sutardja, San Francisco, CA (US)

(73) Assignee: Imera Systems, Inc., San Jose, CA (US)

( * ) Notice: Subject to any disclaimer, the term of this patent is extended or adjusted under 35 U.S.C. 154(b) by 658 days.

(21) Appl. No.: 11/294,215

(22) Filed: Dec. 5, 2005

Related U.S. Application Data

(60) Provisional application No. 60/633,302, filed on Dec. 6, 2004, provisional application No. 60/633,306, filed on Dec. 6, 2004, provisional application No. 60/696,284, filed on Jul. 5, 2005.

(51) Int. Cl.
*G06F 15/16* (2006.01)
*G06F 12/001* (2006.01)

(52) U.S. Cl. ...................... 709/249; 709/250
(58) Field of Classification Search ............. 709/203, 709/227, 217, 218, 250, 248, 249
See application file for complete search history.

(56) References Cited

U.S. PATENT DOCUMENTS

2003/0225848 A1* 12/2003 Heikes et al. ............... 709/207
2004/0103149 A1* 5/2004 Tanigawa et al. ........... 709/204
2005/0097473 A1* 5/2005 Malik et al. ................ 715/739
2006/0047747 A1* 3/2006 Erickson et al. ............ 709/204

* cited by examiner

*Primary Examiner*—Zarni Maung
(74) *Attorney, Agent, or Firm*—Pinnacle Patent Law Group

(57) ABSTRACT

A method for supporting a communication application between a plurality of enterprises in a secure manner, where each enterprise includes a plurality of clients, includes providing a distributed instant multimedia communication (IMC) system that includes a plurality of autonomous networks communicatively coupled to one another via a network. Each autonomous network is associated with an enterprise and includes an IMC server that manages IMC services for a plurality of clients in the enterprise, The IMC server is configured to support a private channel that allows each client in the enterprise to share its presence information with other clients in other enterprises. The method also includes providing the communication application in a first client in a first enterprise such that a user of the first client is allowed to invoke and control the communication application locally, and allowing the user of the first client to invoke the communication application to create application specific data and to create a recipient list comprising a recipient client in a second enterprise. The application specific data and the recipient list are received by a first IMC server associated with the first enterprise, and in response to receiving the application specific data and recipient list, utilizes the private channel to transmit the application specific data to the recipient client in the second enterprise.

14 Claims, 7 Drawing Sheets

SUPPORTING COMMUNICATION APPLICATIONS BETWEEN ENTERPRISES IN A SECURE MANNER

CROSS-REFERENCE TO RELATED APPLICATIONS

This application claims priority to a provisional application entitled "Advanced Communication Using Presence Channel in IMC Systems," Ser. No. 60/633,302, filed Dec. 6, 2004, to a provisional application entitled, "Private Session Publication Through Presence in IMC Systems," Ser. No. 60/633,306, filed Dec. 6, 2004, and to a provisional application entitled "An Efficient and Secure Presence Network in a Distributed Instant Messaging System," Ser. No. 60/696,284, filed Jul. 5, 2005. Each provisional application listed above is herein incorporated in its entirety by reference.

FIELD OF THE INVENTION

The present invention relates to enterprise networking, and more particularly to a method and system for supporting communication applications between enterprises in a secure manner.

BACKGROUND OF THE INVENTION

In many large and small enterprises, as illustrated in FIG. 1A, it is common for a central server, e.g., 110a, to provide advanced communication software tools or applications 120a to a plurality of clients 112a in the enterprise 100a. Such applications or tools 120a can support for example, file sharing, on-line polling, on-line questionnaires, intra-office communications, scheduling and calendaring, and information postings/announcements. For example, a user 130a of a client 112a can launch a meeting scheduler tool 120a residing on the central server 110a to schedule a meeting with several enterprise attendees. The tool 120a can allow the user 130a to select the attendees and to propose several times and days for the meeting. The tool 120a can then send the proposal to the attendees, allow each attendee to select one or more of the proposed times and days, compile the responses, and determine a mutually convenient meeting time and day based on the responses.

In another example, company wide information can be disseminated or made available to the clients 112a through the central server 110a. An announcement tool 120a can post Information concerning functions, meetings and seminars, such as meeting rooms, times, and scheduled speakers, on the enterprise's 100a internal website hosted by the central server 110a and accessed by any of the clients 112a. In another example, clients 112a can access files or documents stored in a central database 140a via the central server 110a. The central server 110a can support many other applications and tools 120a for the enterprise 100a and for the clients 112a therein, and those described above are but a few examples.

Typically, for security reasons, the central server 110a resides behind at least one firewall 150a insulated from a public network 160, such as the Internet. As a result, the central server 110a generally is not accessible by an external client 112b, i.e., a non-enterprise client, due to complications related to firewall traversal, authentication and access control. While this scheme protects the central server 110a from malicious users and viruses, it also precludes access by friendly external clients 130b, e.g., customers, vendors, and partners who have business relationships with the enterprise 100a. Thus, customers 130b who are invited to a meeting at the enterprise 100a would not be allowed to access the enterprise's internal website to find the meeting room and time. Such information would need to be provided outside of the enterprise 100a, e.g., on a website hosted by a server outside of the firewall 150a, where the information would be available to the public. This is not a desirable solution if the meeting involves sensitive and/or confidential matters.

To address some of these concerns, an independent service provider 170, on the Internet, illustrated in FIG. 1B, can offer enterprise-to-enterprise communication tools and applications 120c. The independent service provider 170 acts like a central server in that it controls the application 120c, e.g., on-line polling, on-line questionnaire, meeting scheduler, and file sharing, and routes all network traffic between enterprises 100a, 100b, and through firewalls 150a, 150b, if needed. To that extent, the independent service provider 170 can create supposedly secure communication channels for the information exchange. Nevertheless, because the independent service provider 170 is responsible for sign-in authentication for all attendees where individual enterprises have no control, it is susceptible to a security breach and therefore, the enterprises 100a, 100b using the service can be potentially exposed to identity and virus issues.

In both of the systems described above, the central servers 110a, 110b and independent service provider 170 are generally isolated from other central servers and service providers. The clients registered on different servers or different service providers are isolated from one another. To connect clients who are using difference services requires yet another communication process for service invitation, and this process can be different from enterprise 100a to enterprise 100b. As a result, the application scope of these centralized services can be very limited in terms of the number of clients 112 and enterprises 100a, 100b who are accessing the same service at the same time and who are trying to communicate with each other. This limitation has serious impact to applications in vertical industries, where many enterprises are involved together for business collaborations. Their interactions can follow a "star" model or a "mesh" model, depending on the business relationships. Complicated connection setups between centralized services can cause severe scalability problems among enterprises that have flexible and dynamic collaboration models. In short, the centralized environment is not scalable and typically involves a single enterprise 100a, 100b or a limited number of enterprises. Therefore, the central server solution is not suitable for a vertical industry that can have hundreds of thousands of employees and partners residing in different offices in different countries and continents.

Accordingly, there is a need for a system and method that not only allows users within an enterprise to utilize advanced communication applications and tools within the enterprise, but also allows the users to utilize the same tools with users in different enterprises without requiring a centralized independent service provider to connect services across enterprises. The system should be scalable and should regulate traffic according to enterprise security policies. The system should be adaptable by a large number of enterprises who are conducting business collaborations with each other dynamically in a de-centralized, i.e., distributed, environment.

SUMMARY OF THE INVENTION

In one embodiment, a method for supporting a communication application between a plurality of enterprises in a secure manner, where each enterprise includes a plurality of clients, includes providing a distributed instant multimedia communication (IMC) system that includes a plurality of autonomous networks communicatively coupled to one another via a network. Each autonomous network is associated with an enterprise and includes one or more IMC servers that manage IMC services for a plurality of clients in the enterprise. Each IMC server is configured to support a private channel that allows each client in the enterprise to share its presence information with other clients in other enterprises. The method also includes providing the communication application in a first client in a first enterprise such that a user of the first client is allowed to invoke and control the communication application locally, and allowing the user of the first client to invoke the communication application to create application specific data and to create a recipient list comprising a recipient client in a second enterprise. The application specific data and the recipient list are received by a first IMC server associated with the first enterprise, and in response to receiving the application specific data and recipient list, utilizes the private channel to transmit the application specific data to the recipient client in the second enterprise.

In another embodiment, a method and computer readable medium containing program instructions for reducing network traffic in a distributed instant multimedia communication (IMC) system, where each of a plurality of servers manages IMC services for a plurality of clients, includes receiving by a first server updated presence information relating to a first client managed by the first server. The first server retrieves a peer list associated with the first client that list includes a plurality of peer clients, and identifies which of the peer clients are currently interested in receiving presence information relating to the first client. The updated presence information relating to the first client is then sent to the identified interested peer clients. The updated presence information is not sent to peer clients that are not interested in receiving the presence information thereby reducing network traffic.

In another embodiment, a system for supporting a communication application in a distributed peer-to-peer environment across a plurality of enterprises, where each enterprise includes a plurality of clients, includes a distributed IMC system that includes a plurality of autonomous networks communicatively coupled to one another via a network. Each autonomous network is associated with an enterprise and includes one or more IMC servers that manage IMC services for a plurality of clients in the enterprise. Each IMC server is configured to support a private channel that allows each client in the enterprise to share its presence information with other clients in other enterprises. The communication application resides in a first client in a first enterprise such that a user of the first client invokes and controls the communication application locally in order to create application specific data and a recipient list comprising a recipient client in a second enterprise. The first IMC server receives the application specific data and the recipient list from the communication application in the first client, and utilizes the private channel to transmit the application specific data to the recipient client in second enterprise.

BRIEF DESCRIPTION OF SEVERAL VIEWS OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DETAILED DESCRIPTION

The present invention relates to enterprise networking, and more particularly to a method and system for supporting communication applications between enterprises in a secure manner. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one embodiment, each client device in an enterprise is coupled to a distributed and scalable instant multimedia communication (IMC) system that facilitates secure communication channels within an enterprise and between multiple enterprises, e.g., across domains. The communication application is provided on the client, instead of on a central server, so that a user of the client device is allowed to launch and control the communication application locally. Data associated with the communication application is transmitted, preferably with the security permission from the server to other client devices inside and outside of the enterprise through the secure communication channels created by the distributed IMC system. In one embodiment, the application specific data is transmitted through private presence channels that are also used to transmit presence information relating to clients inside and outside of the enterprise. By utilizing an IMC system, application specific data can be transmitted directly between cooperating enterprises in a secure manner without requiring an independent and centralized service provider. Thus, communication applications can be implemented in a distributed peer-to-peer environment that is secure and scalable.

According to one embodiment, the IMC system is a distributed peer-to-peer instant communication system. Secure private communication channels are created between enterprises and clients to distribute status information, e.g., "online," "out of office," relating to clients, known as presence awareness information, among the clients of each of the enterprises. The IMC system also supports secure communication channels between enterprises so that clients in different enterprises can conduct a secure communication session in substantially real-time. In one embodiment, the IMC system is that described in a co-pending patent application entitled, "Distributed And Scalable Instant Multimedia Communication System," application Ser. No. 11/141,767, filed May 31, 2005, assigned to the assignee of the present invention, and herein incorporated in its entirety by reference.

Figure 1A:
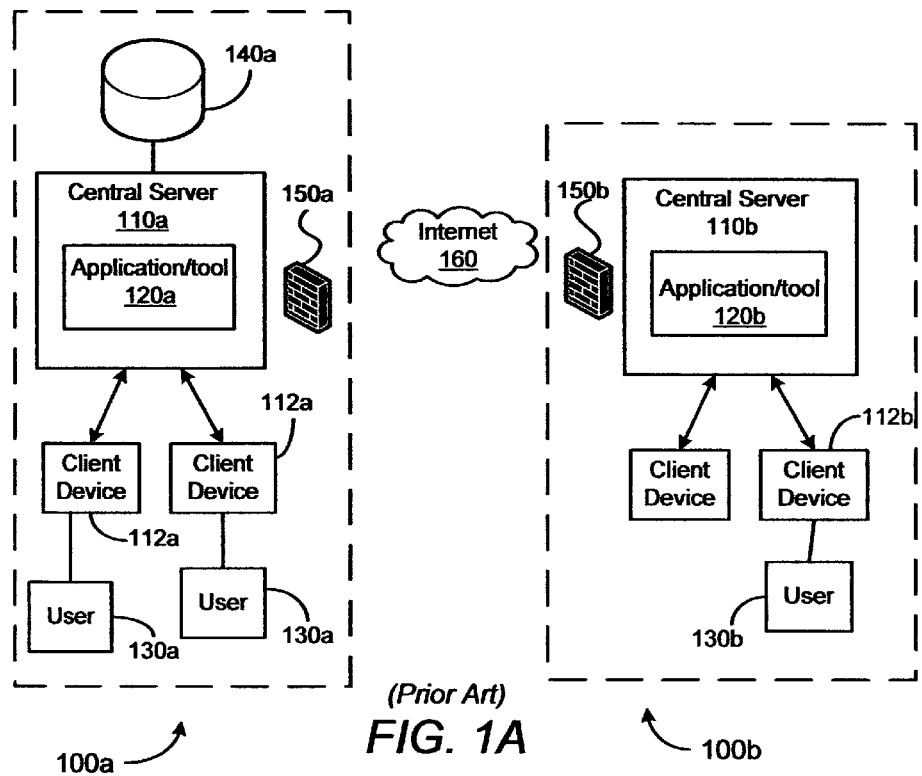
FIG. 1A and FIG. 1B are simple system block diagrams illustrating typical centralized service environments.
Figure 1B:
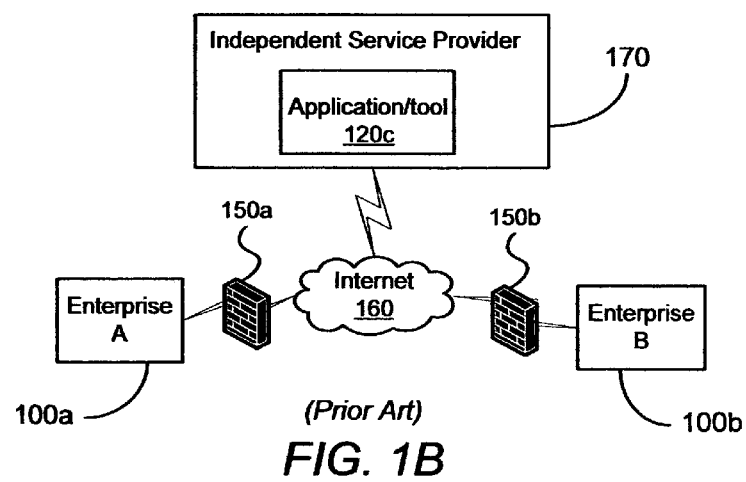
Figure 2:
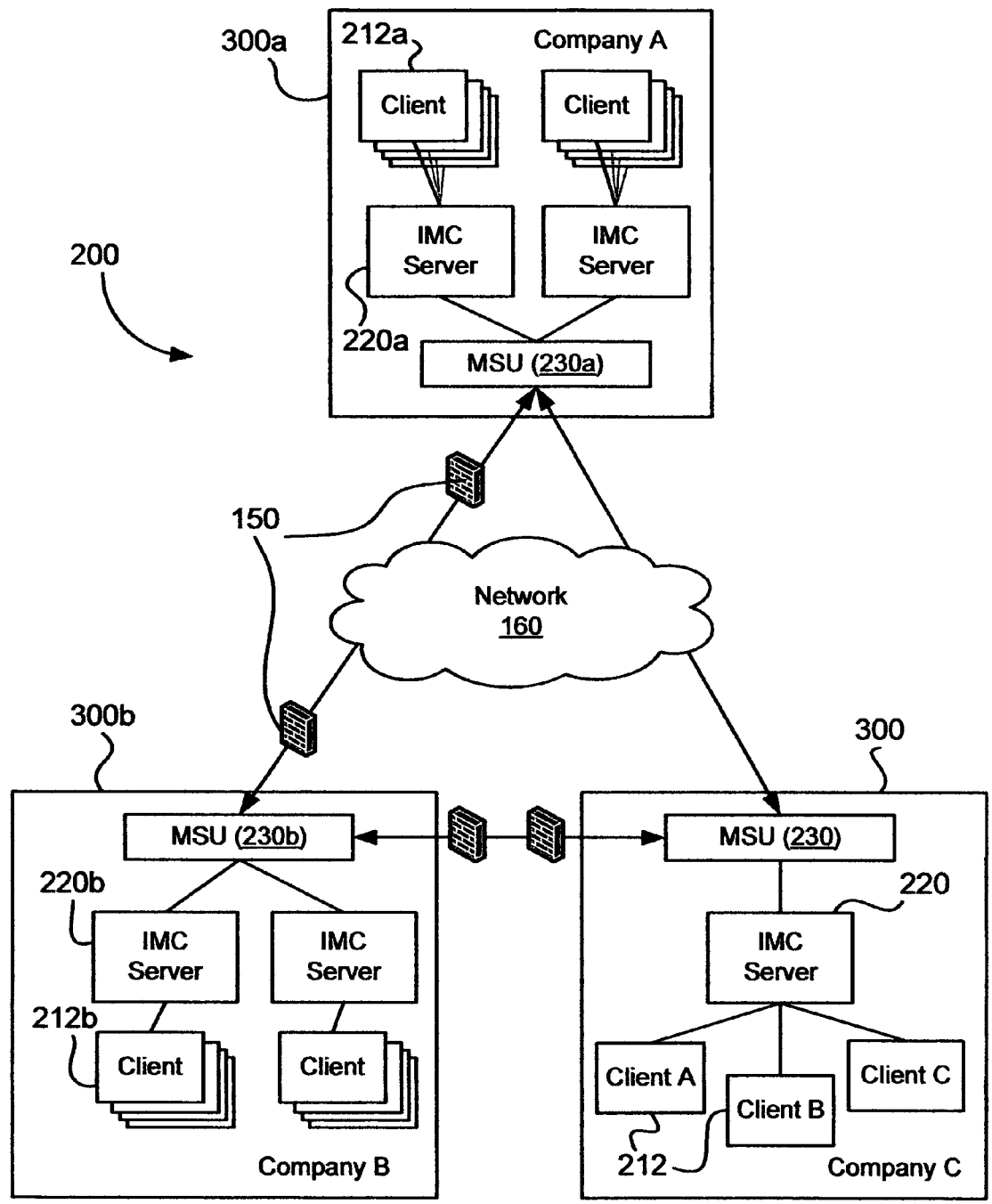
FIG. 2 is a block system diagram of an exemplary distributed instant multimedia communication (IMC) system according to an embodiment of the present invention.

FIG. 2 is a system block diagram of an exemplary distributed IMC system according to one embodiment of the present invention. The IMC system 200 is a networked system that includes a plurality of autonomous networks 300, 300a, 300b, where each autonomous network 300, 300a, 300b is hosted by an enterprise. Although FIG. 2 shows each enterprise hosting one autonomous network ("IMC enterprise network"), it should be appreciated that more than one IMC enterprise network, e.g., 300, 300a, can be hosted by a single company or enterprise. For example, company A and company C can be subsidiaries or subdivisions of a single enterprise. Each IMC enterprise network, e.g., 300a, is typically behind at least one firewall 150, and is configured to communicate with other IMC enterprise networks 300, 300b in a secure manner over a network 160. The network 160 can be either an intranet within a company or a public network, such as the Internet.

Each IMC enterprise network, e.g., 300, includes a plurality of clients 212, at least one IMC server 220, and a multipoint switch unit (MSU) 230. Each client 212 is registered on an IMC server 220 such that the IMC server 220 is aware of each of its clients 212 and can receive and provide presence information from and to each registered client 212. The IMC server 220 also facilitates real-time communication sessions involving its clients 212. Each IMC server 220 is in communication with the MSU 230.

According to one embodiment, the MSU 230 allows the IMC servers 220 within the IMC autonomous network 300 to communicate securely with one another. In addition, the MSU 230 is capable of communicating with an MSU 230b in another IMC enterprise network, e.g., 300b, such that secure inter-enterprise network data exchange is facilitated. In this manner, an IMC server 220 in one IMC enterprise network 300 can exchange data with an IMC server 220a in another IMC enterprise network 300a via their respective MSUs 230, 230a. For example, presence information can be passed from one IMC server 220 to one or more IMC servers, e.g., 220a, 220b, through one or more MSUs 230, 230a, 230b. The secure inter-network communication can involve two or more IMC enterprise networks 300, 300a, 300b to form one real-time communication session.

Each MSU, e.g., 230, is capable of traversing a firewall 150 if the MSU 230b of another IMC enterprise network, e.g., 300b, resides behind a firewall 150. This would typically be the case when one enterprise network 300b hosted by one enterprise communicates with the other enterprise networks 300a hosted by other unaffiliated enterprises via the Internet 160. Thus, business-to-business communication in real-time is facilitated without requiring an independent service provider outside of the firewall 150.

Note that in FIG. 2, the MSU 230 and IMC server 220 are shown as separate components for the sake of clarity. In another embodiment, the MSU 230 and IMC server 220 can be integrated into one component such that each IMC server 220 includes an MSU 230. In this embodiment, one IMC server 220 is designated as a master server and the MSU 230 in the master IMC server is activated. Subordinate IMC servers are coupled to the master IMC server 220 and utilize the MSU 230 in the master IMC server 220. If the master IMC server fails, one of the subordinate IMC servers can assume the role of master and the corresponding MSU 230 is activated. In another embodiment, several MSUs 230 in several IMC servers 220 can be activated to provide load balancing among the IMC servers 220. Accordingly, the IMC system 200 is not limited to the configuration illustrated in FIG. 2, but rather FIG. 2 is an exemplary embodiment of the IMC system 200 in which the present invention can be used.

Figure 3:
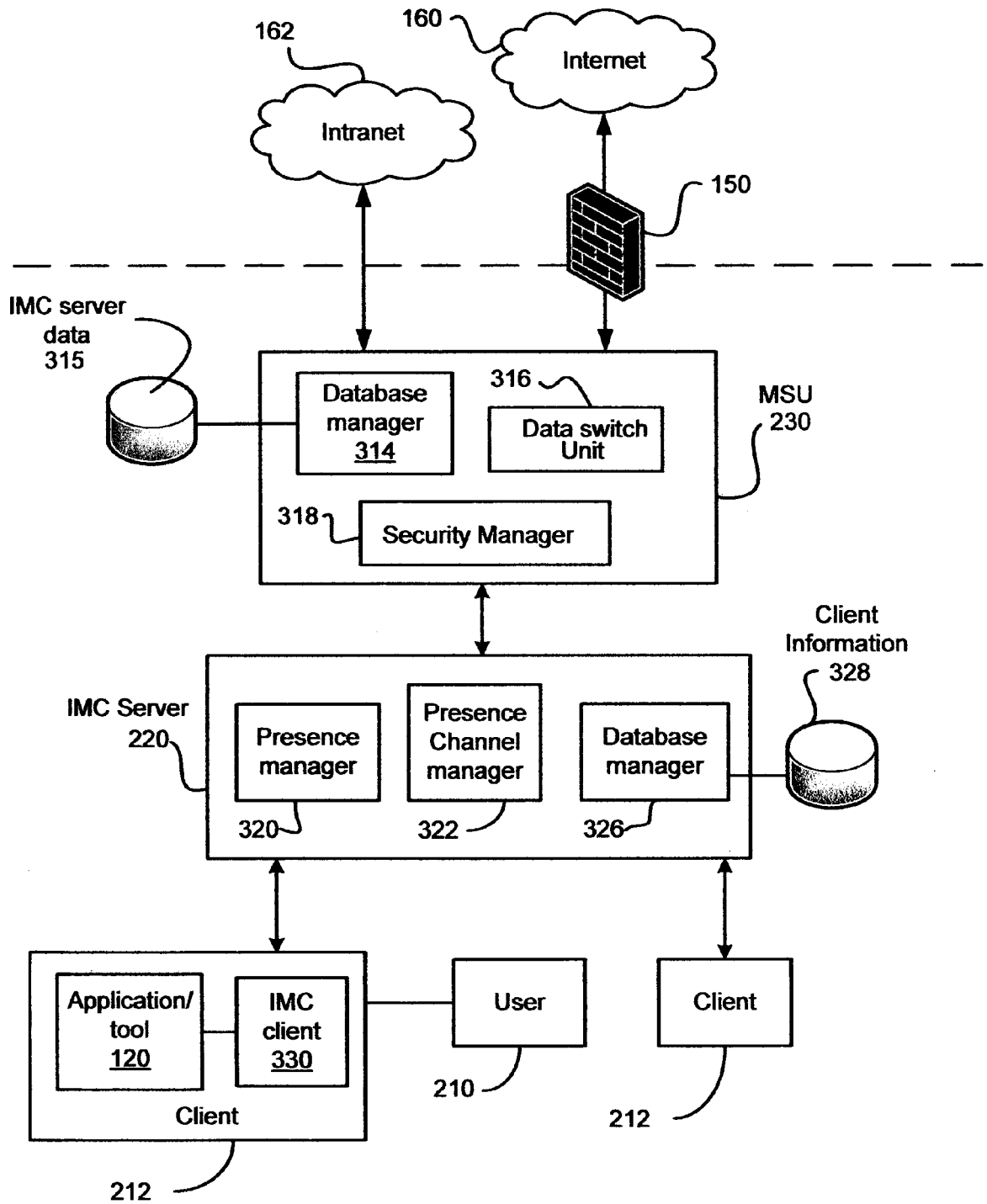
FIG. 3 is a system block diagram of an exemplary IMC network according to an embodiment of the present invention.

FIG. 3 is a system block diagram of an exemplary IMC enterprise network 300 according to an embodiment of the present invention. For the sake of clarity, FIG. 3 shows only one IMC server 220 in communication with the MSU 230. As stated above, however, a plurality of IMC servers 220 can be coupled to the MSU 230, and the IMC server 220 and MSU 230 can be integrated into one unit.

The MSU 230 manages outgoing communications, calls or invitations from the IMC server 220 and handles incoming communications and invitations from other external IMC servers 220 in other enterprise networks, e.g., 300a, 300b, inside or outside of the enterprise. The MSU 230 includes a database manager 314 and a data switch unit 316, and preferably is protected by a firewall 150. The database manager 314 retrieves information relating to the IMC servers 220 supported by the MSU 230 from an IMC server database 315. The IMC server database 315 preferably includes data indicating to which IMC server 220 each client 212 is registered and can also include information that allows a remote client 212 to be redirected to its IMC server 220. For example, this information can be used to allow a client 212 to log in remotely. The data switch unit 316 routes and/or multicasts incoming and outgoing communications to and from the IMC server 220.

The MSU 230 also includes a security manager 318. The security manager 318 controls incoming and outgoing communications pursuant to an enterprise's security policy. In one embodiment, the security manager 318 performs a security check at the domain level, the server level, and the user level. Accordingly, if the enterprise's security policy bans communications from or to certain rival companies, the security manager 318 determines whether an incoming or outgoing message is from or to one of the banned companies and if so, denies access to the client 212 (in the case of an incoming message) or refuses to deliver the offending outgoing message.

Each IMC server 220 in the IMC network 300 is in communication with the MSU 230. The IMC server 220 includes a presence information manager 320, a presence channel manager 322, and a database manager 326. The presence manager 320 handles presence information, such as presence status, related to the clients 212 registered on the IMC server 220 as well as presence information related to peer clients, e.g., 212a, 212b, registered in other enterprise networks 300a, 300b. A user 210 of a client 212 can sign-on to the enterprise network 300 and access the presence manager 320 to view the presence status of other clients 212, 212a, 212b via an IMC client 330 in the client 212. The presence status of the other clients 212, 212a, 212b indicates who might be available for an IMC session.

The presence channel manager 322 creates and controls a private presence channel for sending a client's presence information to other clients 212 in the same enterprise or to peer clients 212a, 212b in another enterprise. The presence channel manager 322 also receives presence information from clients 212, 212a, 212b and forwards that information to the presence manager 320. The database manager 326 retrieves information relating to the clients 212 registered on the IMC server 220 from a client database 328. The client database 328 preferably stores data such as a client's peer list, authenticating information for peer clients, as well as a client's function default selections, and presence grant list, i.e., who is allowed to see the presence of this client 212.

In one embodiment, a communication application or tool 120 is provided in a client 212, as opposed to in a central server in the enterprise or in a central site provided by an independent service provider. In this manner, the user 210 can invoke and control the application or tool 120 locally. The application 120 is coupled to the IMC client 330 so that application specific data can be transmitted to other clients 212, 212a, 212b in the same enterprise or in other enterprises through the secure communication channels created by the IMC system 200.

Figure 4:
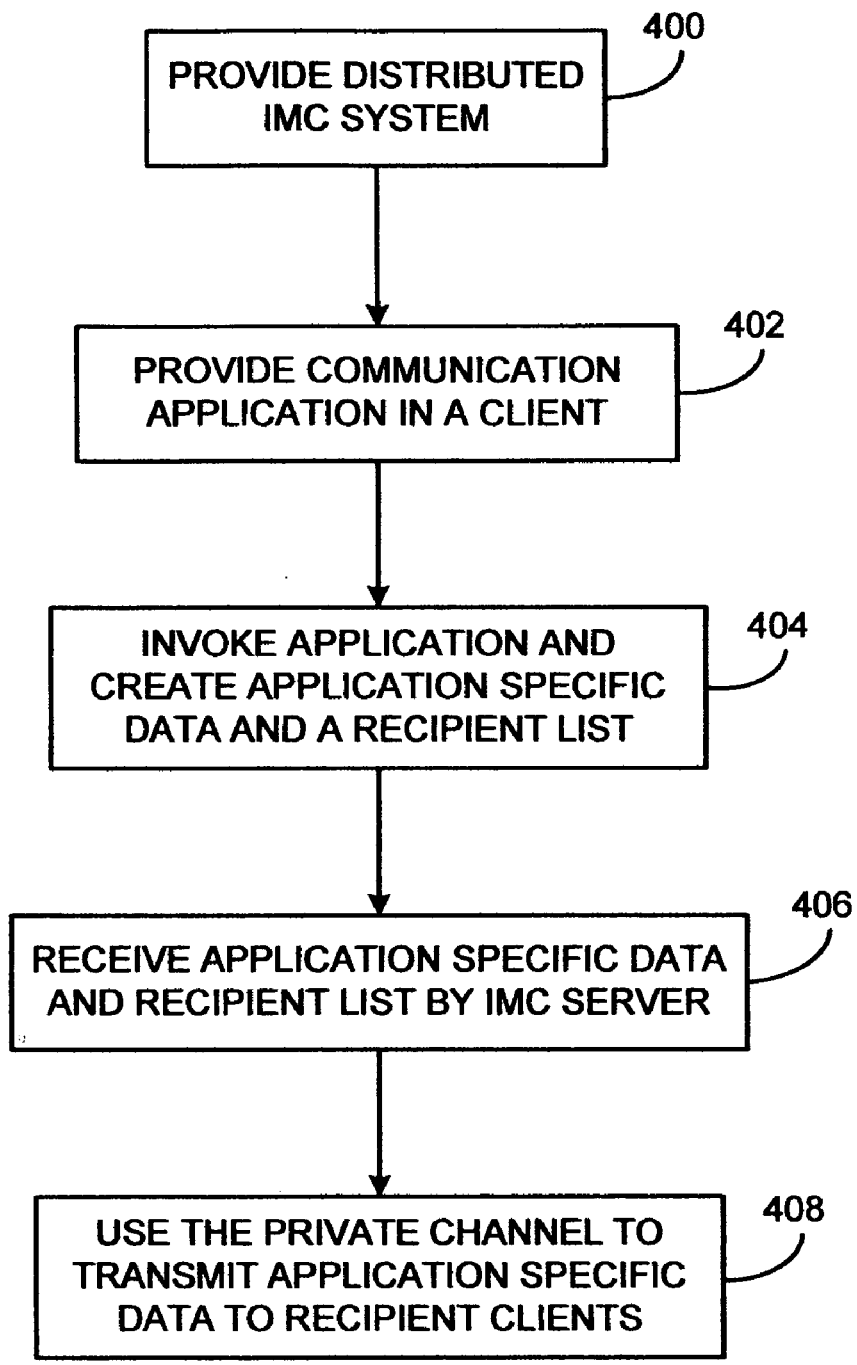
FIG. 4 is a high level flowchart illustrating a process of supporting a communication tool according to an embodiment of the present invention.

FIG. 4 is a high level flowchart illustrating a process of supporting a communication tool according to an embodiment of the present invention. Referring to FIG. 2, FIG. 3 and FIG. 4, the process begins by providing a distributed IMC system 200 that supports secure instant communication channels between two or more enterprises (block 400). An exemplary IMC system 200, described above with regard to FIG. 2, includes a plurality of IMC enterprise networks 300, 300a, 300b coupled to one another by a network 160. Each enterprise network, e.g., 300, is associated with an enterprise and includes at least one IMC server 220 that manages IMC services for clients 212 in the enterprise. The IMC server 220 is configured to support a private channel that allows each client 212 to share its presence information with other clients 212, 212a, 212b in other enterprises.

Next, the communication application 120 is provided in a client 212 (block 402) so that a user 210 can invoke and control the communication application 120 locally. The communication application 120 can be any application or tool that facilitates communications between two or more clients 212, 212a, 212b. For example, the communication application 120 can be a polling application or a Blog application that seeks the opinions and preferences of several clients 212, 212a, 212b, or a questionnaire that seeks answers from the other clients 212, 212a, 212b. The communication application 120 can also be a meeting scheduler that requests the other client's availability, receives the other clients' replies, and compiles the responses to select a time and day for the meeting.

In one embodiment, the communication application 120 can be used to share information, such as information relating to a private meeting session hosted by the user 210, with selected clients 212, 212a, 212b. Such information can include the session name, the type of session, the resource being made available, and an invitation to join the session. The communication applications described above are exemplary and other communication applications are available and well known to those skilled in the art.

The user 210 is allowed to invoke the communication application 120 to create application specific data and to create a recipient list, which preferably includes at least one recipient client, e.g., 212a, in another enterprise network 300a (block 404). The application specific data can be a poll, a questionnaire, a personal calendar, a Blog, or the like. The application specific data can also include a link to data that the user 210 wishes to share with the recipient client 212a. In another embodiment, the application specific data can also include a storage location into which a file can be uploaded when the user 210 is requesting the file or data from the recipient client 212a. When the user 210 is ready to send the application specific data, the application specific data and the recipient list are forwarded to and received by the IMC server 220 via the IMC client 330 coupled to the communication application 120 (block 406). For each recipient client 212a, the presence channel manager 322 in the IMC server 220 opens a private presence channel, by e.g., establishing a network connection, and utilizes the private channel to transmit the application specific data to the recipient client 212a in the other enterprise network 300a (block 408).

In one embodiment, prior to opening the private channel to the recipient client 212a, the IMC server 220 calls the security manager 318 in the MSU 230 to perform a security check. Preferably, the security manager 318 confirms that the user 210 of the client 212 is authorized to transmit application data, and performs a security check on the recipient client 212a to ensure that the enterprise's security policies are enforced. The security manager 318 preferably checks the recipient client 212a and the recipient client's enterprise 300a against the enterprise's security policy. If the user 210 and the recipient client 212a and the recipient client's enterprise 300a are approved, i.e., authorized, the IMC server 220 then proceeds with opening the private channel.

Figure 5:
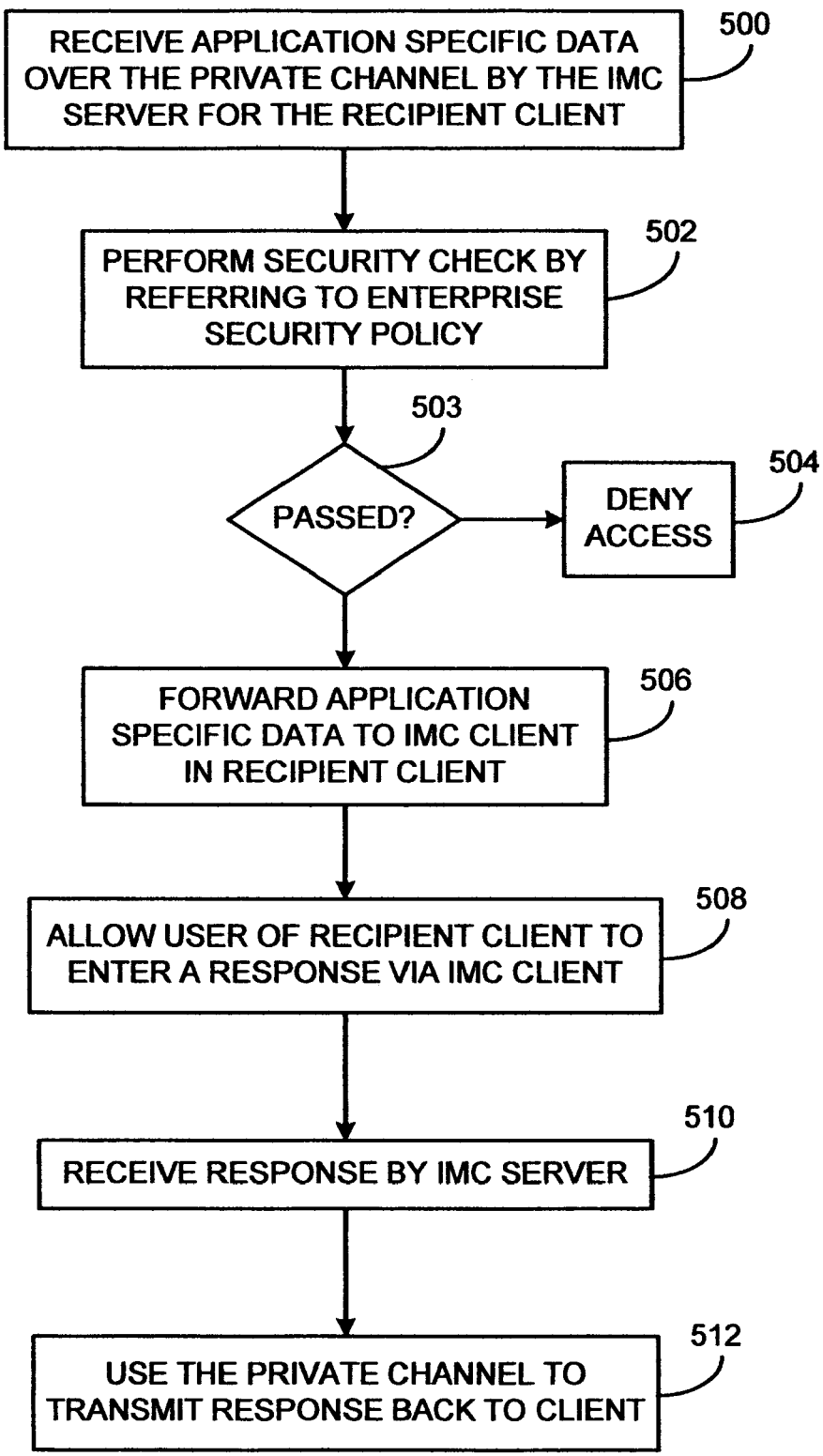
FIG. 5 is a flowchart illustrating a method of processing application specific data received at the recipient client's IMC server according to one embodiment of the present invention.

FIG. 5 is a flowchart illustrating a method of processing application specific data received at the recipient client's IMC server 220a according to one embodiment of the present invention. The recipient clients IMC server 220a ("recipient IMC server") receives the application specific data from the sending IMC server 220 over the private presence channel between the two enterprise networks 300, 300a (block 500). In one embodiment, the recipient IMC server 220a can perform a security check on the sending client 212, sending IMC server 220 and sending enterprise network 300 (block 502). If the security check passes (block 503), the application specific data is forwarded to the IMC client 330 in the recipient client 212a (block 506). The IMC client 330 allows the user 210 of the recipient client 212a to enter a response relating to the application specific data (block 508).

The response varies depending on the communication application 120 used to create the application specific data. In one embodiment, the response can include an answer sheet, e.g., in response to a questionnaire, or a selection of a particular items, e.g., in response to a poll. In another embodiment, the response can include a calendar showing which days the user of the recipient client 212a is available for a meeting. In another embodiment, the response can include a request to access a file that the sending client 212 wishes to share, or the response can include a file or data to be stored at a storage location specified by the application specific data.

Once completed, the response is then forwarded to and received by the recipient IMC server 220a (block 510). In one embodiment, the response is stored in the client information database 328 (FIG. 3). The presence channel manager 322 in the recipient IMC server 220a opens a private presence channel and utilizes the private channel to transmit the response to the sending client 212 (block 512). Note that because the recipient IMC server 220a has previously performed a security check on the sending client 212, no such measures need be taken prior to opening the private presence channel.

Figure 6:
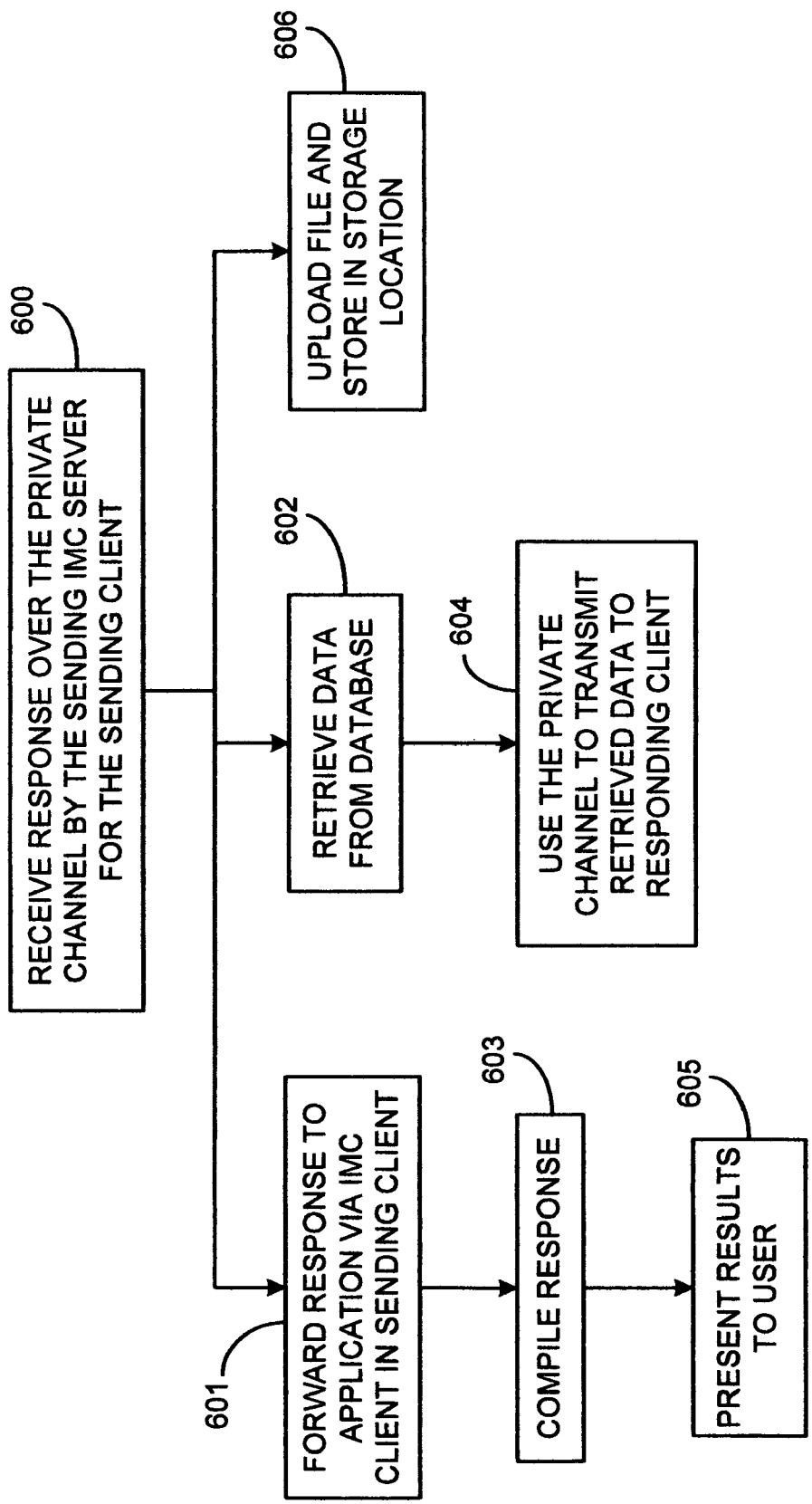
FIG. 6 is a flowchart illustrating a method of processing a response to application specific data according to an embodiment of the present invention.

FIG. 6 is a flowchart illustrating a method of processing a response to application specific data according to an embodiment of the present invention. The sending IMC server 220 receives the response from a responding client 212a over the private presence channel between the two enterprise networks 300, 300a (block 600). As stated above, the response varies depending on the communication application 120 used to create the application specific data. In one embodiment where the response is an answer to a question, a poll, or is an indication of the user's availability, or the like, the response is forwarded to the communication application 120 in the sending client 212 via the IMC client 330 (block 601). Depending on the application 120, the response can be compiled (block 603) and analyzed, and the application 120 can present the results to the user 210 (block 605), via a display (not shown).

In another embodiment, the response includes a request to access data that the sending client 212 wishes to share with the responding client 212a. For example, instead of creating application specific data that includes the meeting time, place, agenda and speakers, the sending client 212 can create application specific data that includes a link to the meeting information, which is stored in a storage device, such as the client information database 328. In this embodiment, the response is not necessarily forwarded to the application 120, but rather, the sending IMC server 220 retrieves the requested data (block 602). In one embodiment, if the data is stored in the client information database 328, the IMC server 220 utilizes the database manager 326 to retrieve the requested data.

Once the data is retrieved, the presence channel manager 322 in the sending IMC server 220 opens or uses an existing private presence channel and utilizes the private channel to transmit the data to the responding client 212a (block 604). Note that because the sending IMC server 220 has previously performed a security check on the recipient/responding client 212a, no such measures need be taken prior to processing the response and/or opening the private presence channel.

In another embodiment, the response includes information or a file requested by the sending client 212 that is to be stored at the sending IMC server 220. For example, instead of creating application specific data that merely requests a file to be returned to the sending client 212, the user 210 can create application specific data that includes a request for a file and a storage location in a storage device, such as the client information database 328, into which the requested file should be stored. In this embodiment, the response, which includes the requested file and storage location is uploaded by the sending IMC server 220 which then utilizes the database manager 326 to store the requested file in the storage location (block 606).

According to embodiments of the present invention, the private presence channel used by the distributed IMC system to transmit presence information between clients 212, 212a, 212b in two or more enterprises is treated as a general communication channel among clients for communication applications 120. In this manner, communication applications 120 that are typically supported by central servers or centralized independent service providers can be implemented in a peer-to-peer distributed environment, which offers enterprise-to-enterprise communication capabilities and high security. Moreover, unlike the centralized system, the distributed IMC system is highly scalable.

By opening the private presence channel to application specific data in addition to presence information, the number of network connections and the volume of network traffic in the presence channel increases. In order to accommodate the increased network traffic caused by the addition of application specific data in a distributed network environment, it is imperative that extraneous network traffic be reduced or eliminated.

One particular type of extraneous network traffic is updated presence information being transmitted to uninterested and/or unavailable peer clients on a peer list. Because the IMC system 200 is a distributed system, the clients in one enterprise are not necessarily aware of the presence status of other clients in other enterprises. Thus, when a client updates its presence status, the updated presence information is pushed to all peer clients on the peer list, regardless of whether a peer client is interested or unavailable to receive the update.

This blind push can generate significant levels of extraneous traffic. For example, if a user's presence information is updated 50 times in a given day and the user's peer list includes 100 peers, the IMC server 220 will establish network connections for 5,000 messages and send each message over the private channel to the 100 peers regardless of whether all or any of the 100 peers are available to receive or are interested in receiving the update. When every IMC server 220 supports hundreds of clients 212, and when the IMC system 200 includes several hundred IMC servers 220, the inter-domain network traffic increases exponentially and can adversely affect performance.

According to one embodiment of the present invention, data traffic on the private presence channel is reduced to accommodate the addition of application specific data by sending updated presence information to peer clients who are interested in receiving and are available to receive the updated presence information. If, at any given time, half of the peer clients on a peer list are unavailable to receive updates, then the data traffic associated with one update, at any given time, can be halved. When this is applied throughout the IMC system 200, the data traffic over the presence channel is significantly reduced, thereby providing additional bandwidth for application specific data.

Figure 7:
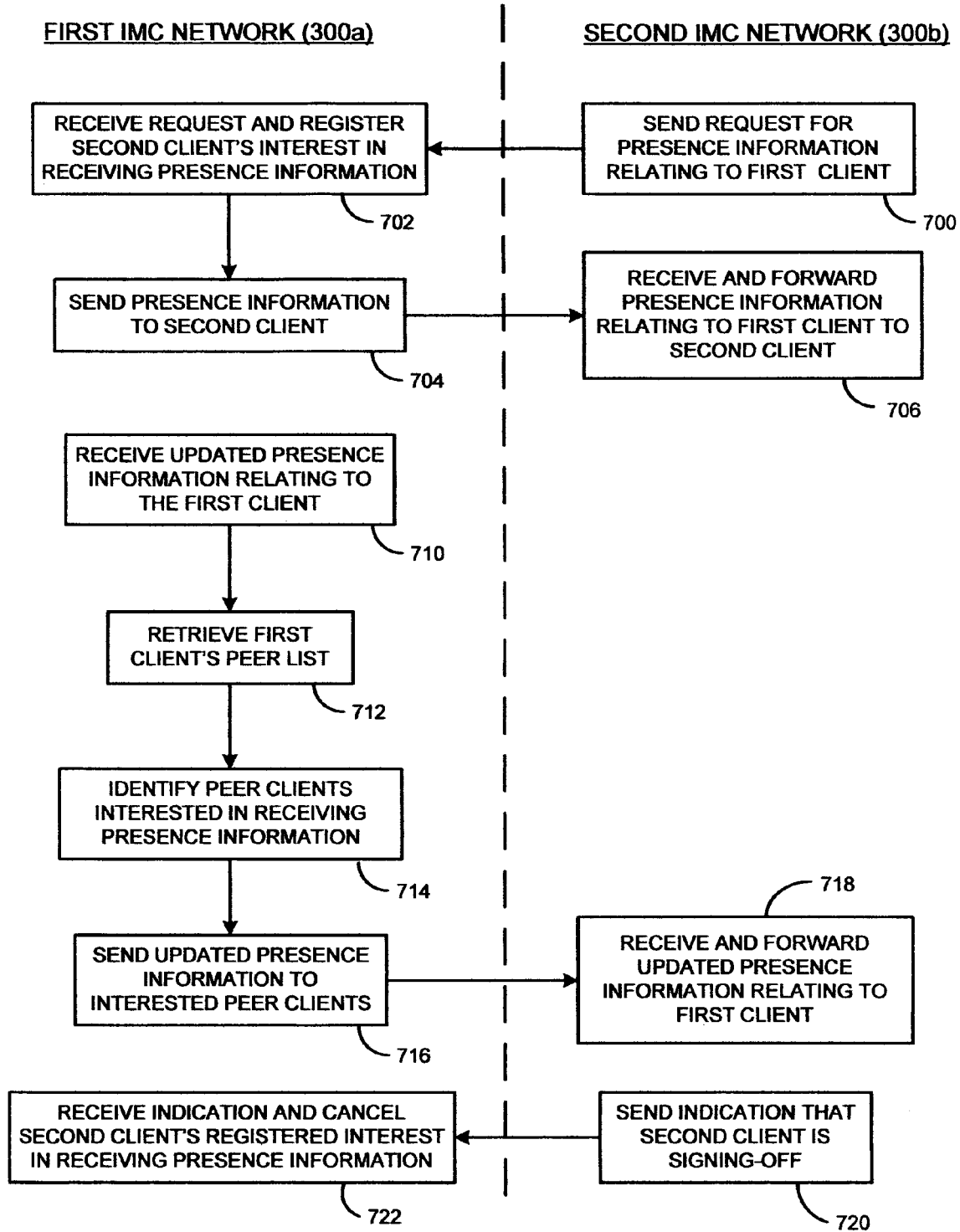
FIG. 7 is a flow diagram illustrating a process for reducing network traffic in an IMC system according to an embodiment of the present invention.

FIG. 7 is a flow diagram illustrating a process for reducing network traffic in an IMC system 200 according to an embodiment of the present invention. Referring to FIG. 2, FIG. 3 and FIG. 7, in this example, first and second clients 212a, 212b are registered with first and second IMC servers 220a, 220b in first and second IMC enterprise networks 300a, 300b. The process begins when the second client 212b sends a request for presence information relating to the first client 212a (block 700). In one embodiment, the request can be sent when the second client 212b signs-on to the IMC system 200 via the second IMC server 220b. The request can be sent to each of the peer clients, including the first client 212a, on the second client's peer list via the presence channel. In one embodiment, prior to sending the request, the second IMC server 220b calls the security manager 318 in the MSU 230b to perform a security check on the first client 212a to ensure that the enterprise's security policies are enforced.

The first IMC server 220a receives the request and registers the second client's interest in receiving the presence information relating to the first client (block 702). In one embodiment, the presence manager 320 (FIG. 3) registers the second client's interest and stores such interest in the client information database 328. In another embodiment, prior to registering the second client's interest, the IMC server 220a calls the security manager 318 in the MSU 230a to perform a security check on the second client 212b to ensure that the enterprise's security policies are enforced. The security manager 318 preferably checks the second client 212b and the second client's enterprise network 300b against the enterprise's security policy. If the second client 212b and the second client's enterprise network 300b are approved, i.e., authorized, the IMC server 220a then proceeds with registering the second client's interest.

Once the first IMC server 220a has registered the second client's interest, the first IMC server 220a establishes a network connection and uses the presence channel to send the first client's presence information to the second client 212b via the second IMC server 220b (block 704). The second IMC server 220b receives the presence information and forwards it to the IMC client 330 on the second client 212b (block 706).

Subsequently, the first IMC server 220a receives updated presence information relating to the first client 212a via the IMC client 330 (block 710). In response, the IMC server 220a retrieves the first client's peer list (block 712) and identifies which of the peer clients on the peer list are currently interested in receiving the presence information relating to the first client (block 714). The IMC server 220a is able to make this determination by identifying those peer clients that have a registered interest in receiving the first clients presence information. Once the interested peer clients have been identified, including the second client 212b, the first IMC server 220a uses the presence channel to send the first client's presence information to each of the interested peer clients, including the second client 212b (block 716).

In one embodiment, the first IMC server 220a groups interested peer clients, e.g., 212b, by their respective IMC enterprise networks 300b, establishes a single presence channel for each of the respective enterprise networks 300b, and uses the single presence channel to send the updated presence information to the IMC enterprise network 300b. The updated presence information is then distributed to the interested peer clients 212b locally by the MSU 230b and IMC server 220b. In this manner, fewer network connections are needed to send the updated presence information to interested peer clients that are in the same IMC enterprise network 300b.

Note that because each of the interested peers has already passed the security check when their interests were registered, a security check is not required here. The second IMC server 220b receives the presence information and forwards it to the IMC client 330 on the second client 212b (block 718).

Eventually, the user of the second client 212b decides to sign-off and notifies the second IMC server 220b. The second IMC server 220b uses the presence channel to send an indication that the second client 212b is signing-off to those peer clients on the second client's peer list who are interested in receiving the second client's presence information, including the first client 212a (block 720). The first IMC server 220a receives the indication, and in response, cancels the second client's registered interest in receiving the first client's presence information (block 722). In one embodiment, the first IMC server 220a performs a security check on the second client 212b prior to canceling the second client's registered interest. Accordingly, subsequent presence information updates relating to the first client 212a will not be sent to the second client 212b because the second client 212b no longer has a registered interest in receiving such information.

By sending presence information to interested peer clients on a client's peer list and not to disinterested peer clients, the number of network connections and the amount of data traffic over the presence channel is significantly reduced. Moreover, grouping interested peer clients by their respective IMC networks and sending the presence information to each group of interested peer clients using a single network connection further reduces the number of network connections. This reduction accommodates the increased traffic due to the application specific data created by the communication applications so that the IMC system 200 operates efficiently.

An embodiment of the present invention utilizes an instant multimedia communication system 200 to support communication applications and tools 120 between a plurality of enterprises. The communication application 120 is provided on a client 212, instead of on a central server, so that a user 210 of the client 212 is allowed to launch and control the communication application 120 locally. Preferably, a layer of security control is provided to enforce an enterprise's security policies for incoming and outgoing communications received and sent by clients 212. After security clearance, the data associated with the communication application 120 is transmitted to other clients inside and outside of the enterprise through the secure communication channels created by the distributed IMC system 200. In one embodiment, the application specific data is transmitted through private presence channels that are also used to transmit presence information relating to clients inside and outside of the enterprise. By utilizing an IMC system 200, application specific data can be transmitted directly between cooperating enterprises in a secure manner without requiring an independent and centralized service provider. Thus, communication applications 120 can be implemented in a distributed peer-to-peer environment that is secure and scalable.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for supporting a communication application between a plurality of enterprises in a secure manner, wherein each enterprise includes a plurality of clients, the method comprising:
   providing a distributed instant multimedia communication (IMC) system that includes:
      a plurality of autonomous networks communicatively coupled to one another via a network, wherein each autonomous network is associated with an enterprise of the plurality of enterprises, and each autonomous network comprises:
         an IMC server that manages IMC services for a plurality of clients in the enterprise, and is configured to support a private channel that allows each client of the plurality of clients in the enterprise to share its presence information with other clients in at least one other enterprise;
   providing the communication application in a first client in a first enterprise such that a user of the first client is allowed to invoke and control the communication application locally;
   allowing the user of the first client to invoke the communication application to create application specific data and to create a recipient list comprising a recipient client in a second enterprise;
   receiving, by a first IMC server associated with the first enterprise, the application specific data and the recipient list from the communication application in the first client; and
   in response to receiving the application specific data and recipient list, utilizing the private channel to transmit the application specific data to the recipient client in second enterprise.

2. The method of claim 1 further comprising:
   prior to transmitting the application specific data, checking a security policy of the first enterprise to determine if the second enterprise is an authorized enterprise and to determine if the recipient client is an authorized client; and if both the second enterprise and recipient client are authorized, transmitting the application specific data.

3. The method of claim 1 wherein the communication application includes an on-line polling application, a Blog application, an on-line questionnaire, a meeting scheduling application, or a calendar sharing application.

4. The method of claim 1 wherein the communication application allows the user to create application specific data that includes an invitation to participate in an IMC session hosted by the first client, wherein the invitation includes a session name, a session time, and instructions for joining the IMC session.

5. The method of claim 1 further comprising:
   receiving by the first IMC server a response to the application specific data from the recipient client, wherein the response is received over the private channel; and
   forwarding the response to the communication application in the first client.

6. The method of claim 5 wherein the application specific data includes a link to a file and the response comprises a request to access the file, the method further comprising:
   retrieving by the first IMC server the file; and
   using the private channel to transmit the file to the recipient client.

7. The method of claim 5 wherein the application specific data includes a request for a file and a storage location into which the requested file is to be stored and the response comprises the requested file and the storage location, the method further comprising uploading and storing the requested file to the storage location.

8. The method of claim 1 further comprising:
   reducing data traffic on the private channel in order to accommodate the presence information and application specific data.

9. The method of claim 8 wherein each of the plurality of clients in the first enterprise is associated with a peer list that comprises peer clients in other enterprises and wherein reducing data traffic includes:
   prior to sharing presence information relating to the first client with any of the peer clients in the first client's peer list, identifying which of the peer clients are interested in receiving the first client's presence information; and
   transmitting the first clients presence information to the interested peer clients over the private channel, wherein data traffic in the private channel is reduced because the presence information is not transmitted to disinterested peer clients.

10. The method of claim 9 further comprising:
    receiving by the first IMC server a request from a peer client to receive the first client's presence information; and
    in response to receiving the request, registering the peer client's interest in receiving the first client's presence information in the first IMC server such that the IMC server can identify the peer client as an interested peer client.

11. The method of claim 9 wherein at least two interested peer clients are associated with a second enterprise, and wherein transmitting the first client's presence information to the at least two interested peer clients includes:
    establishing a single network connection between the IMC first server and the second enterprise; and
    using the single network connection to transmit the first client's presence information to the second enterprise, wherein a second server in the second enterprise distributes the first client's presence information to the at least two interested peer clients locally.

12. A system for supporting a communication application in a distributed peer-to-peer environment across a plurality of enterprises, wherein each enterprise includes a plurality of clients, the system comprising:
    a distributed instant multimedia communication (IMC) system that includes:
       a plurality of autonomous networks communicatively coupled to one another via a network, wherein each autonomous network is associated with an enterprise of the plurality of enterprises, and each autonomous network comprises:
          an IMC server that manages IMC services for a plurality of clients in the enterprise, and is configured to support a private channel that allows each client of the plurality of clients in the enterprise to share its presence information with other clients in at least one other enterprise,
    wherein the communication application resides in a first client in a first enterprise such that a user of the first client invokes and controls the communication application locally in order to create application specific data and a recipient list comprising a recipient client in a second enterprise, wherein a first IMC server associated with the first enterprise receives the application specific data and the recipient list from the communication application in the first client, and in response to receiving the application specific data and recipient list, utilizes the private channel to transmit the application specific data to the recipient client in second enterprise.

13. The system of claim 12 wherein prior to transmitting the application specific data, the first IMC server checks a security policy of the first enterprise to determine if the user of the first client is authorized and to determine if the second enterprise is an authorized enterprise and if the recipient client is an authorized client, and if the user, the second enterprise and recipient client are authorized, transmits the application specific data over the private channel.

14. The system of claim 12 wherein the communication application allows the user to create application specific data that includes an invitation to participate in an IMC session hosted by the first client, wherein the invitation includes a session name, a session time, and instructions for joining the IMC session.

* * * * *